United States Patent [19]

Borowiec

[11] Patent Number: 4,894,589
[45] Date of Patent: Jan. 16, 1990

[54] STARTING MEANS, WITH PIEZOELECTRICALLY-LOCATED CAPACITIVE STARTING ELECTRODES, FOR HID LAMPS

[75] Inventor: Joseph C. Borowiec, Schenectady, N.Y.

[73] Assignee: General Electric Company, Schenectady, N.Y.

[21] Appl. No.: 229,187

[22] Filed: Aug. 8, 1988

[51] Int. Cl.⁴ .......................................... H05B 41/24
[52] U.S. Cl. .................................... 315/248; 313/146; 313/147; 313/153
[58] Field of Search ...................... 315/39, 111.51, 236, 315/248, 267, 344, 357; 313/146, 151, 152, 153, 234, 574, 607, 147

[56] References Cited

U.S. PATENT DOCUMENTS 4,812,702 3/1989 Anderson ........................ 315/344 X Primary Examiner—David Mis
Attorney, Agent, or Firm—Geoffrey H. Krauss; James C. Davis, Jr.; Marvin Snyder

[57] ABSTRACT

A pair of starting electrodes are provided for an electrodeless high-intensity-discharge lamp of the type having an arc tube situated within the bore of an excitation coil and in the interior of which tube is to be provided a plasma arc discharge driven by the excitation coil. Each of the starting electrodes is a conductive ring actuated by a piezoelectric bender to move from a normal rest position away from the arc tube to a starting portion disposed adjacent to an associated one of an opposed pair of envelope surfaces. A high-voltage pulse coupled between the starting electrodes causes an electric field to be produced sufficient to create a glow discharge in the arc tube, and cause an almost instantaneous transition to a high-current solenoidal discharge to form the discharge plasma responsive to the normal field provided by the excitation coil; thereafter, the benders are de-activated and the starting electrodes move back to the rest positions.

11 Claims, 1 Drawing Sheet

STARTING MEANS, WITH PIEZOELECTRICALLY-LOCATED CAPACITIVE STARTING ELECTRODES, FOR HID LAMPS

BACKGROUND OF THE INVENTION

The present invention relates to electrodeless high-intensity discharge (HID) lamps and, more particularly, to novel means with piezoelectrically-located electrodes for initiating a plasma discharge within the arc space of the electrodeless HID lamp.

It is now well known to provide a toroidal light-emitting plasma within the envelopes of a HID lamp. The induction arc plasma depends upon a solenoidal, divergence-free electric field for its maintenance; the field is created by the changing magnetic field of an excitation coil, which is typically in the form of a solenoid. It is necessary to develop a very high electric field gradient across the arc tube to start the plasma discharge; it is difficult to develop a sufficiently high electric field gradient, especially in the associated excitation coil, because the coil current may be prohibitively high, even if it is to be provided only on a pulse basis. Further, providing a very high electric field gradient may be impossible because the necessary field-per-turn of the excitation coil may exceed the turn-to-turn electrical breakdown reading of that coil. Thus, it is difficult to provide some means for starting induction-driven HID lamps, and it is also difficult to provide for hot restarting of the same type of lamp. It is therefore highly desirable to provide some means for starting the HID lamp plasma discharge, which starting means can be easily utilized with typical HID lamps, under normal ambient conditions. One type of starting electrode, and a heat-sensitive means for moving those electrodes into and out of a starting location, are described and claimed in U.S. application Ser. No. (225,315), filed July 28, 1988, assigned to the assignee of the present invention and incorporated herein by reference in its entirety. However, it is desirable to be able to selectively move the starting electrodes, so as to be able to re-start the lamp even if the extinguished arc tube is still hot.

BRIEF SUMMARY OF THE INVENTION

In accordance with the invention, an electrodeless high-intensity discharge lamp, having an envelope situated within the bore of an excitation coil and in the interior of which envelope is to be provided a plasma discharge driven by the excitation coil, is provided with starting means having a pair of starting electrodes which are normally located away from the arc tube. The starting electrodes, each of which is an interrupted conductive ring disposed adjacent to an associated one of an opposed pair of envelope end surfaces and connected to an opposite end of the excitation coil, are moved by piezoelectric means to a starting location adjacent to the arc tube top and bottom exterior surfaces. Coupling of a high-voltage pulse between the pair of starting electrodes causes an electric field to be produced between the pair of electrodes, of magnitude and position sufficient to cause the material within the lamp envelope to create a glow discharge in the arc tube, due to the arc tube wall capacitance. The glow discharge creates enough ionization in a suitable location so that an almost instantaneous transition to a high-current solenoidal discharge occurs and the discharge plasma forms responsive to the normal field provided by the excitation coil. The piezoelectric means is inactivated after the lamp operation commences, to return the starting electrodes to their normal locations away from the arc tube.

Accordingly, it is an object of the present invention to provide novel starting means with piezoelectrically-located capacitive starting electrodes for an electrodeless high-intensity-discharge lamp.

This and other objects of the invention will become apparent upon reading the following detailed description, when considered in conjunction with the drawings.

DETAILED DESCRIPTION OF THE INVENTION

Figure 1A:
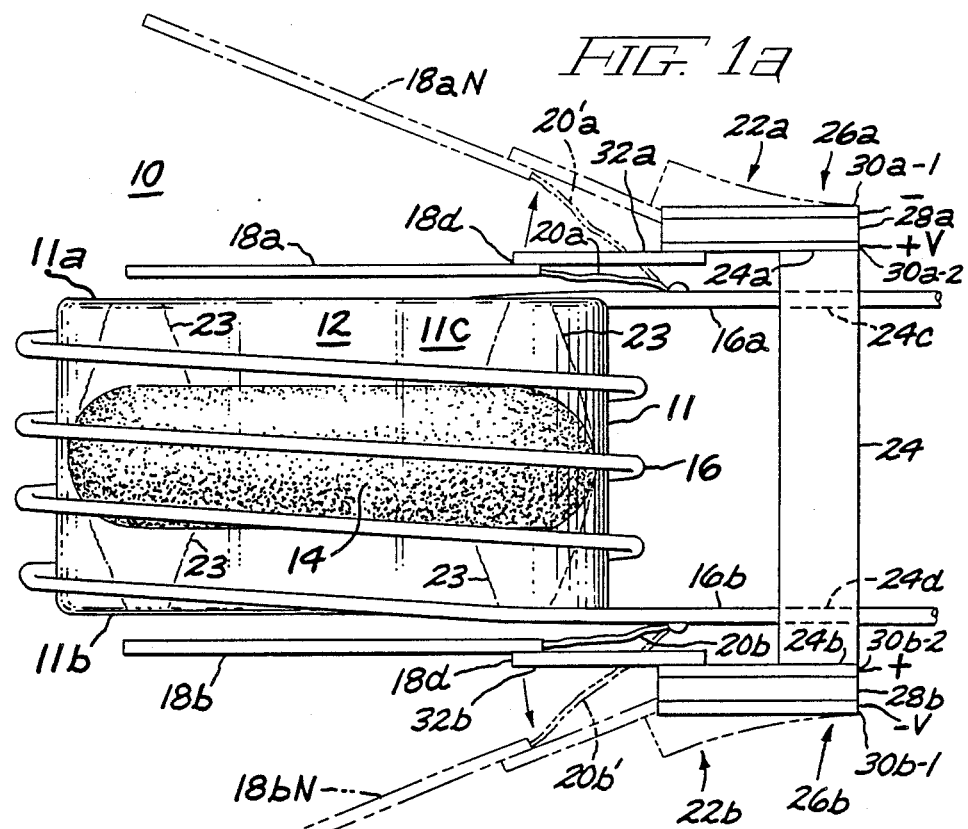
FIGS. 1a and 1b are respective side and top views of an electrodeless HID lamp, an excitation coil therefore, and of a present preferred embodiment of novel piezoelectrically-located capacitive starting electrodes in accordance with the invention, at both the starting and normal rest positions thereof.
Figure 1B:
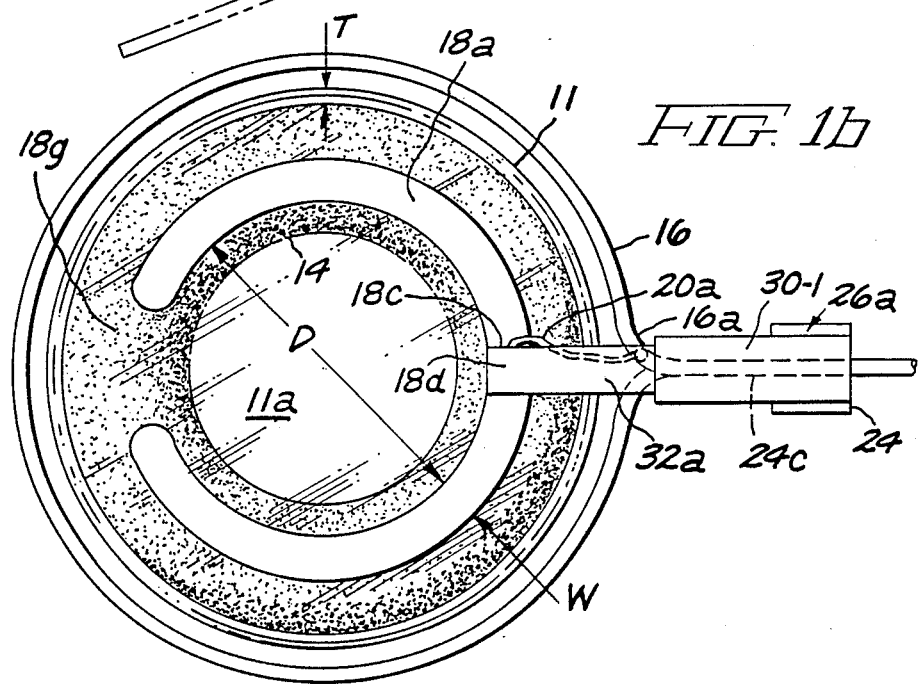

Referring to FIGS. 1a and 1b, an induction, or electrodeless, high-intensity-discharge (HID) lamp 10 comprises an arc tube, or envelope, 11 having a substantially cylindrical shape, enclosing a substantially gaseous material 12 including a starting gas, such as argon, xenon, krypton and the like, and a metal halide, such as sodium iodide, cerium iodide and the like. A substantially toroidal arc discharge 14 is to be generated and then maintained within envelope 11 by an electric field generated by an excitation coil 16, responsive to a radio-frequency (RF) signal applied between the opposite coil ends 16a and 16b. Envelope 11 is positioned with its axis generally along the axis of coil 16.

In accordance with the invention, each of a pair of starting electrodes 18a and 18b are provided as a generally ring-shaped conductive member which is to be located adjacent to the exterior of a pair of opposed arc tube surfaces, i.e. the top and bottom surfaces 11a and 11b, of the arc tube. As illustrated, ring members 18 will, in use, extend in a plane substantially parallel to the adjacent surface, and are thus generally perpendicular to the substantially-mutual axis of envelope 11 and coil 14, when in use. A central section 18c of each ring member 18a and 18b is connected, by a flexible conductive element 20a or 20b respectively, to the adjacent end 16a or 16b, respectively, of the excitation coil. Because each of ring-shaped conductive members 18a and 18b is within the electric field, a non-conductive gap portion 18g is provided in the ring to prevent formation of a completed turn, so that the ring member does not form a secondary coil having a high circulating current therein; gap portion 18a can be a removed portion, as shown, or can be present but formed of a non-conductive material. Advantageously, the gap portion 18g is positioned substantially opposite to the portion 18c at which conductive member 20a or 20b is attached to the ring member 18a or 18b, respectively, and so positioned as to balance the mass of the ring member 18 with respect to an attachment portion 18d, which may overlap and include portion 18c; this mass balance may be important for purposes of moving the starting electrodes 18 toward and away from arc tube 11.

In order to aid in the starting of the plasma arc discharge 14, starting members 18 must each be located in close proximity to the adjacent exterior surface of the arc tube, but do not have to be in contact with the envelope. Responsive to a high voltage and current (on the order of 2500 V and 15 A), applied to excitation coil 16, a high voltage is applied across the arc tube 11 from the upper starting electrode 18a to lower starting electrode 18b, forming generally ring-shaped glow discharge regions 23. The glow discharge volume 23 generates enough ionization, in a very favorable location with respect to the desired discharge plasma toroid 14, so that transition to the high-current plasma arc discharge occurs almost instantaneously. The magnitude of the capacitive current across the wall of arc tube 11 can be estimated by assuming that the capacitive starting aid ring members 18 have an interior diameter D of about 14 millimeters, a width W of about 1 millimeter and have a total area of about 47 square millimeters. If the arc tube wall has a thickness T of about 1 millimeter and is made of quartz with a dielectric constant $\epsilon_r = 3.8$ at 13.56 MHz., then the capacitance across an arc tube of diameter 20 millimeters and height 17 millimeters, can be calculated to be about 1.6 picofarads. With 1000 V, at 13.56 MHz., applied across the arc tube wall, the capacitive current is about 140 mA. Such a high current level significantly aids the starting process. It should be noted that conductive element 20 may be removed or replaced with insulative members and the capacitive starting aid members 18 then connected to a separate RF power supply, rather than to the excitation coil 16, for application of high voltage. A separate power supply does not have to operate at the same frequency as the excitation coil, and may be energied only during the starting process. A separate starting supply allows more flexibility in the design of excitation coil 16 and the RF power source (not shown) therefore, although such a separate starting supply may add to the cost and complexity of the lamp-driving circuitry.

The starting members must be moved away from the arc tube, after the plasma arc discharge torus 14 has formed, to prevent the starting electrodes from (1) interfering with temperature control of the arc tube, (2) blocking light emission therefrom, or (3) causing early degradation due to ion bombardment of the ar tube by the continuous capacitive currents which would be flowing even during normal lamp operation. To alleviate the foregoing disadvantages, the presently preferred embodiment normally positions the starting electrodes ~aN and 18bN away from the arc tube, by means of piezoelectric locating means 22.

Means 22 includes an upper means 22a for moving upper electrode 18a, and supported on a first end 24 of a support member 24, having a second end 24b to which is attached a lower means 22b for moving lower electrode 18b. The rigid, insulative support member 24 has a pair of holes 24c and 24d formed therethrough for allowing the coil ends 16a and 16b to be supported and positioned. The actual moving elements are a piezoelectric bender 26a, having a piezoelectric ceramic core member 28a placed between a first electrode 30a-1 and a second electrode 30a-2 attached to support end 24a and another piezoelectric bender 26b, having another piezoelectric ceramic core means 28b placed between a first electrode 30b-1 and a second electrode 30b-2 attached to support end 24b. A first insulative member 32a attaches upper ring electrode center portion 18d in a substantially rigid manner to an associated portion, such as lower electrode 30a-2, of the first bender means 26a, while a second insulative member 32b attaches lower ring electrode center portion 18d in a substantially rigid manner to an associated portion, such as lower electrode 30b-2, of the second bender means 26b. The bender means 26 are configured so that the start-aiding electrodes 18 are removed from the vicinity of arc tube 11 in the absence of activation of means 26 so that, after the lamp has started, the starting aids do not: substantially block light emission; interfere with the thermal balance of arc tube 11; or contribute to lamp degradation. Only when an actuating DC voltage V is connected with proper amplitude and polarity to electrodes 30 (e.g. with positive polarity to electrodes 30-2, in the direction in which bending is desired) does the normally-removed electrodes 18N (shown in broken line) move closer to the arc tube 11, to the positions of electrodes 18a and 18b shown in unbroken lines, and allow glow discharge regions 23 to be formed responsive to a high-voltage signal. The actuating voltage V is reduced or removed, once the arc is lit, and the starting electrodes are returned to their rest positions. Thus, the starting electrodes can be moved to arc tube 11 at any time, by applying voltage V, to allow restart even if the tube is hot.

While one presently preferred embodiment of my novel invention has been described in detail herein, it will now become apparent that many modifications and variations can be made by those skilled in the art. It is my desire, therefore, to be limited only by the scope of the appending claims and not by the specific details and instrumentalities presented by way of explanation herein.

What I claim is:

1. Means for aiding starting of a plasma arc discharge within an arc tube of an electrodeless high-intensity-discharge (HID) lamp of the type having said arc tube situated within the bore of an excitation coil and within which arc tube said plasma arc discharge is to be formed and driven by the excitation coil, comprising:

a pair of starting electrodes;
   means for positioning each of the starting electrodes, at least during commencement of the plasma arc discharge, to a first location adjacent to the exterior surface of an associated one of a pair of opposed surfaces of the arc tube, responsive to the presence of a stimulus, and for repositioning each starting electrode to a second location different from said first location, with respect to said arc tube, responsive to the absence of said stimulus; and
   means for coupling an externally-provided high-voltage signal between the pair of starting electrodes to cause creation, at least at said plasma arc discharge commencement, of a glow discharge within the arc tube due to capacitive current flow therethrough from said starting electrodes.

2. The start-aiding means of claim 1, wherein said positioning means comprises first and second piezoelectric means, each for moving an associated one of said starting electrodes toward an associated arc tube surface when activated and for returning the associated starting electrode to a normal-rest position removed from said arc tube when de-activated.

3. The start-aiding means of claim 2, wherein at least one of said electrodes is a substantially ring-shaped conductive member.

4. The start-aiding means of claim 3, wherein each ring-shaped electrode has a gap portion therein, devoid of conductive material.

5. The start-aiding means of claim 2, wherein said coupling means comprises a flexible conductive member connecting a selected portion of the electrode to an adjacent portion of the excitation coil.

6. The start-aiding means of claim 5, wherein the conductive member connects the electrode to an adjacent end portion of the excitation coil.

7. The start-aiding means of claim 6, wherein at least one of said electrodes is a substantially ring-shaped conductive member.

8. The start-aiding means of claim 7, wherein each ring-shaped electrode has a gap portion therein, devoid of conductive material.

9. The start-aiding means of claim 2, wherein said moving means comprises bender elements for moving the starting electrodes responsive to receipt of a voltage stimulus.

10. The start-aiding means of claim 9, wherein the moving means further comprises a substantially rigid member for insulatively connecting a selected portion of each electrode to a portion of the associated bender element.

11. The start-aiding means of claim 9, further comprising a support member for substantially fixedly positioned the bender elements with respect to the arc tube.

* * * * *